United States Patent
Schneider et al.

(10) Patent No.: US 7,647,911 B2
(45) Date of Patent: Jan. 19, 2010

(54) SMALL END CON ROD GUIDANCE PISTON

(75) Inventors: Norbert Schneider, South Lyon, MI (US); Bartholomew Christopher, Ypsilanti, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 21 days.

(21) Appl. No.: 11/835,489

(22) Filed: Aug. 8, 2007

(65) Prior Publication Data

US 2009/0038577 A1 Feb. 12, 2009

(51) Int. Cl.
*F02F 3/00* (2006.01)

(52) U.S. Cl. .................. 123/193.4; 123/197.3

(58) Field of Classification Search .......... 123/197.3, 123/193.4, 193.6; 74/579 R, 44, 55, 579 E, 74/50; 92/207
See application file for complete search history.

(56) References Cited

U.S. PATENT DOCUMENTS

| | | | |
|---|---|---|---|
| 1,770,818 A | 7/1930 | Summers | |
| 1,926,329 A | 9/1933 | Chilton | |
| 2,315,403 A | 3/1943 | Dillon | |
| 3,007,755 A * | 11/1961 | Daub | 92/229 |
| 3,259,028 A * | 7/1966 | Hutto | 92/228 |
| 4,013,057 A | 3/1977 | Guenther | |
| 4,073,220 A | 2/1978 | Guenther | |
| 4,358,881 A | 11/1982 | Mahrus et al. | |
| 4,577,595 A | 3/1986 | Deutschmann et al. | |
| 4,593,660 A * | 6/1986 | Elsbett et al. | 123/193.6 |
| 4,724,746 A * | 2/1988 | Hill | 92/207 |
| 5,112,145 A * | 5/1992 | MacGregor | 384/286 |
| 6,260,472 B1 | 7/2001 | Zhu et al. | |
| 6,499,387 B2 | 12/2002 | Bedwell | |
| 6,715,457 B1 | 4/2004 | Shoptaw et al. | |
| 6,825,450 B2 | 11/2004 | Ribeiro et al. | |
| 6,973,723 B2 | 12/2005 | Cagney et al. | |

FOREIGN PATENT DOCUMENTS

| | | |
|---|---|---|
| EP | 0050256 B1 | 10/1981 |
| JP | 59153951 A | 9/1984 |
| JP | 04076257 A | 11/1992 |
| JP | 05272639 A | 10/1993 |

* cited by examiner

*Primary Examiner*—Michael Cuff
*Assistant Examiner*—Hung Q Nguyen
(74) *Attorney, Agent, or Firm*—Robert L. Stearns; Dickinson Wright PLLC

(57) ABSTRACT

A connecting rod for a piston assembly includes first and second guidance members for guiding a piston assembly within a cylinder during piston stroke along a first axis. The guidance members are supported by first and second support ribs extending from a shaft of the connecting rod and include first and second sliding surfaces for contacting side walls of the cylinder. The connecting rod includes an attachment boss disposed at a first end of the shaft and defines a second axis perpendicular to the first axis. The first and second support ribs extend radially outwardly from the attachment boss and are spaced radially about the second axis by approximately 180 degrees.

21 Claims, 4 Drawing Sheets

SMALL END CON ROD GUIDANCE PISTON

BACKGROUND OF THE INVENTION

1. Field of the Invention

The subject invention relates generally to a piston assembly and a connecting rod for a piston assembly.

2. Description of the Prior Art

Known piston assemblies include a piston head for reciprocation within a cylinder along a piston stroke. A pair of pin bosses depend downwardly from the piston head, with pin bores defined therein. A connecting rod is pivotably attached via a pin to the pin bores, allowing the connecting rod to oscillate as it translates along the piston stroke. As the piston head translates along the piston stroke, and as the connecting rod oscillates, side loads are induced within the assembly. To take these side loads, piston skirts are provided to slide along the side wall of the cylinder. Known piston skirts depend downwardly from the piston head, or extend outwardly from the pin bosses.

SUMMARY OF THE INVENTION AND ADVANTAGES

A connecting rod for a piston assembly is provided. The connecting rod includes a shaft extending between a first end and a second end and an attachment boss disposed at the first end of the shaft. An attachment bore is defined within the attachment boss for receiving a piston pin. At least one guidance member extends from the shaft and has a sliding surface for engaging a side wall of a cylinder.

A piston assembly is also provided. The piston assembly includes a piston head for translation within a cylinder along a first axis. A pair of pin bosses depends downwardly from the piston head in the direction of the first axis. Pin bores are defined therein and are aligned axially with each other defining a second axis. A connecting rod includes a shaft and an attachment boss disposed at a first end of the shaft. An attachment bore is defined within the attachment boss for axial alignment with the pin bores to pivotably connect the connecting rod to the piston head about the second axis. The connecting rod includes at least one guidance member disposed on the shaft for guiding the piston head during translation within the cylinder.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
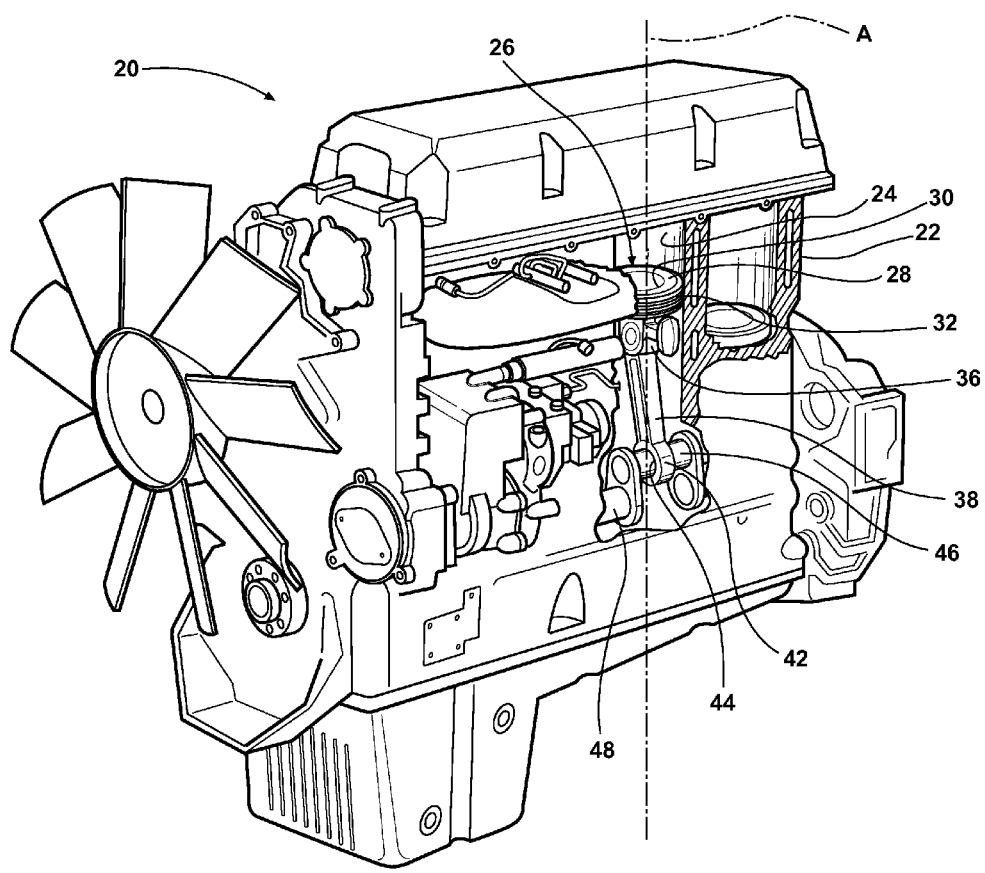
FIG. 1 is a cross section of an engine having a piston assembly and a connecting rod in accordance with an exemplary embodiment of the present invention.

Referring to the Figures, wherein like numerals indicate corresponding parts throughout the several views, an engine is generally indicated at 20. Referring to FIG. 1, the engine 20 includes an engine block 22 with a bore formed within the engine block 22 defining a cylinder 24 extending along a first axis A. A piston assembly is generally shown at 26, and is disposed within the cylinder 24. The piston assembly 26 includes a piston head 28 having a top that extends circumferentially about the first axis A. A combustion bowl 30 is disposed on an upper surface of the top of the piston head 28. A ring belt 32 depends downwardly from the top in the direction of the first axis A. The ring belt 32 is cylindrical, depending downwardly from the periphery of the top of the piston head 28 and includes a plurality of ring grooves 34 extending circumferentially thereon for supporting a plurality of piston rings 74. Although a cylindrical ring belt 32 is shown, it will be understood that other geometries can be used, such as an oval shape, depending on the type of engine 20 and the shape of the cylinder 24 used. As can be seen more clearly in FIG. 2, a piston gallery 35 is defined in the piston head 28, radially inward of the ring belt 32 and axially beneath the combustion bowl 30. The piston gallery 35 receives oil for cooling the piston during operation of the engine 20, and can be closed by a coverplate (not shown).

Referring again to FIG. 1, a connecting rod 36 is pivotably connected about a second axis B to the piston head 28 and includes a shaft 38 and an attachment boss 40 disposed at a first end of the shaft 38, sometimes referred to as the small end. At a second end of the shaft 38 is a crankshaft boss 42 defining a crankshaft bore 44. The crankshaft boss 42 is pivotably connected to a crank 46, which is in turn connected to a crankshaft 48. The piston head 28 is translatable along the first axis A within the cylinder 24, reciprocating between end points, referred to as piston stroke. As the piston assembly 26 translates along the piston stroke, the shaft 38 of the connecting rod 36 oscillates about the second axis B, turning the crank 46. This converts the reciprocating motion of the piston head 28 into rotational motion of the crankshaft 48, which can be used to rotate a set of vehicle wheels (not shown).

Figures 2, 3:
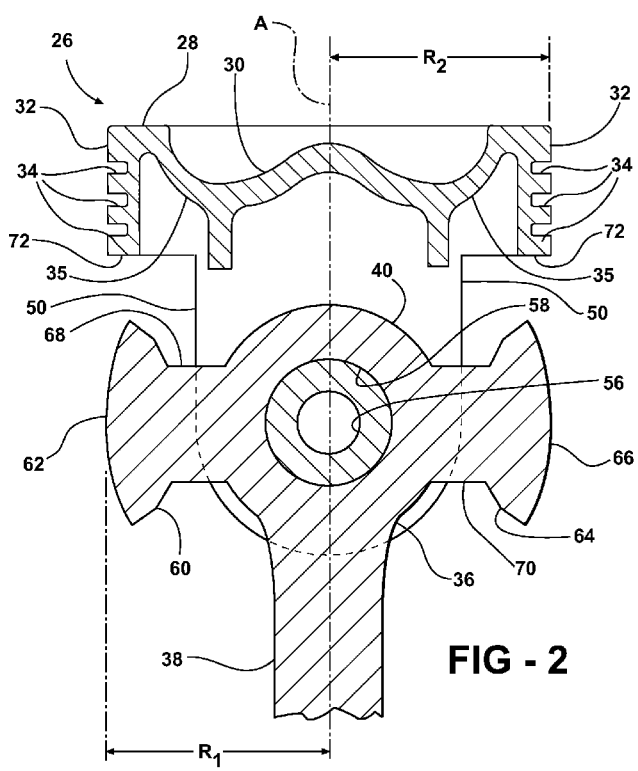
FIG. 2 is a cross section of the piston assembly in accordance with the exemplary embodiment.
FIG. 3 is a perspective view of the piston assembly in accordance with the exemplary embodiment.

Referring to FIGS. 1-3, the piston head 28 includes a pair of pin bosses 50 depending downwardly from the top, and disposed radially inward from the ring belt 32. A set of supports 52 secure the pin bosses 50 to the piston head 28. A pair of pin bores 54 are defined within the pin bosses 50 and are aligned axially with each other along the second axis B. The pin bores 54 are sized to receive a piston pin 56. The attachment boss 40 of the connecting rod 36 defines an attachment bore 58, and is aligned axially with the pin bores 54 along the second axis B. The attachment boss 40 is disposed between the pin bosses 50. The piston pin 56 extends along the second axis B and is inserted through the pin bores 54 and the attachment bore 58 of the attachment boss 40, to pivotably connect the connecting rod 36 to the piston head 28 about the second axis B.

Figure 4:
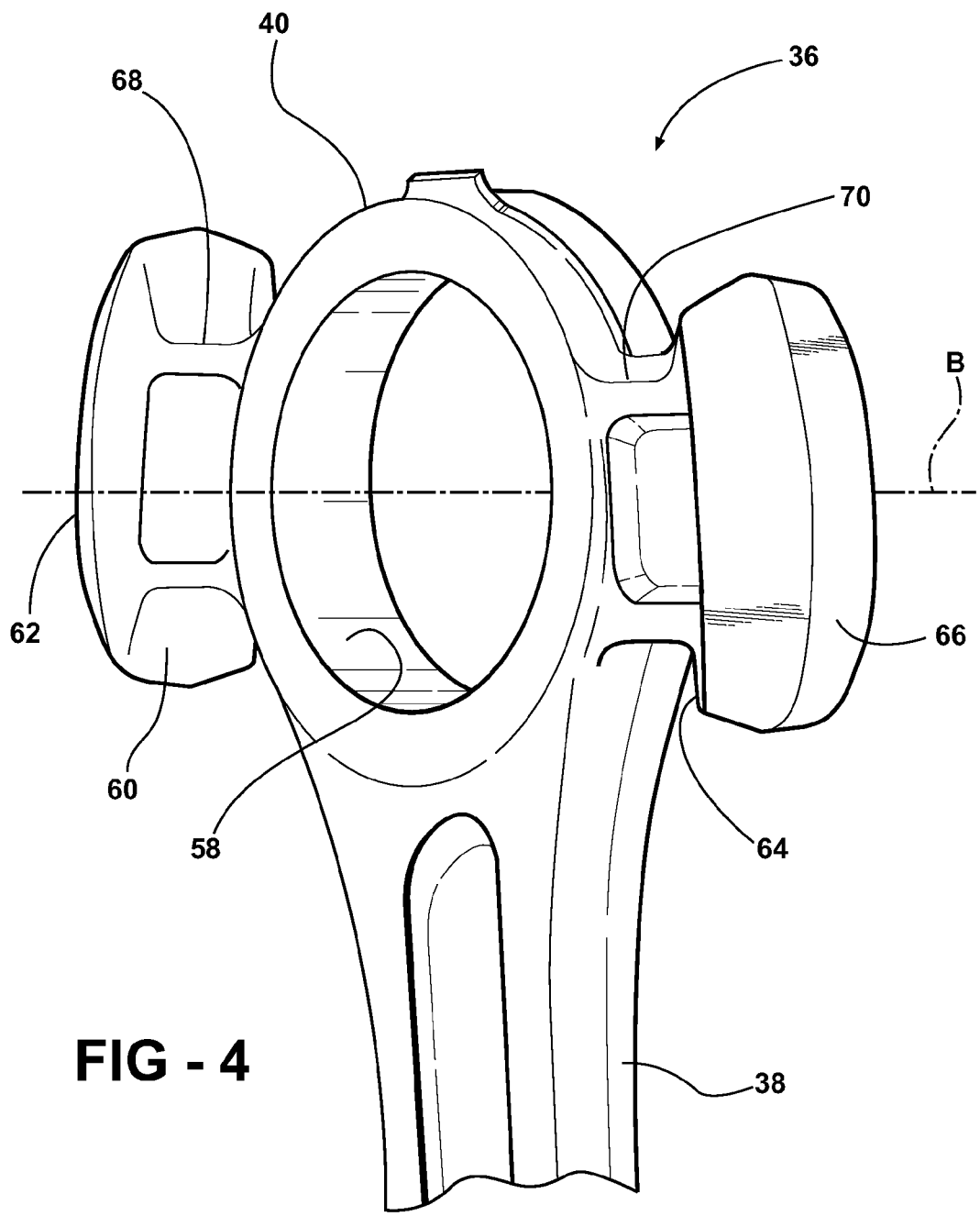
FIG. 4 is a perspective view of the connecting rod in isolation in accordance with the exemplary embodiment.

Referring to FIG. 4, the connecting rod 36 is shown in isolation and includes a first guidance member 60 disposed on the shaft 38 to guide the piston head 28 during the piston stroke. The first guidance member 60 includes a first sliding surface 62 that engages a side wall of the cylinder 24. A second guidance member 64 is disposed on the shaft 38 and includes a second sliding surface 66. The first and second sliding surfaces 62, 66 each have an arcuate shape. As viewed from a perspective outside of the piston assembly 26, the first and second sliding surfaces 62, 66 form a convex arc. Extending downwardly between the top of the sliding surfaces 62, 66 and an intermediate point between the top and bottom, the first and second sliding surfaces 62, 66 curve away from the first axis A. Extending downwardly between the intermediate point and the bottom, the first and second sliding surfaces 62, 66 curve toward the first axis A.

A first support rib 68 extends from the shaft 38 perpendicularly to the second axis B to connect the shaft 38 to the first guidance member 60. A second support rib 70 extends from the shaft 38 perpendicularly to the first axis A to connect the shaft 38 to the second guidance member 64. The first and second sliding surfaces 62, 66 are supported by the first and second support ribs 68, 70 and spaced perpendicularly from the first axis A, and from a centerline of the shaft 38, to contact the side walls of the cylinder 24 during the piston stroke.

According to the exemplary embodiment, the first and second support ribs 68, 70 extend radially outwardly from the attachment boss 40, and the second guidance member 64 is spaced radially about the second axis B by approximately 180 degrees from the first guidance member 60. The intermediate point defining the outermost point of the convex arc on the sliding surfaces 62, 66 is aligned with the intersection between the first and second axes A, B, as well as the intersection between the centerline of the shaft 38 and the center of the attachment bore 58, such that the distances between the sliding surfaces 62, 66 is the greatest at the center of the attachment bore 58.

Referring to FIGS. 1 and 4, the convex outer surface of the sliding surfaces 62, 66 contacts the side wall of the cylinder 24 at a point of contact, and the oscillating motion of the connecting rod 36 moves the point of contact to various different points along the first and second sliding surfaces 62, 66. Maintaining a point of contact prevents excess contact between the sliding surfaces 62, 66 and the side wall of the cylinder 24 from locking, or jamming, the piston assembly 26 within the cylinder 24.

The first and second guidance members 60, 64 slide along the side walls of the engine 20 cylinders 24, just as a piston skirt (not shown) would. However, the piston assembly 26 in the exemplary embodiment lacks a piston skirt. Therefore, the first and second support ribs 68, 70 are designed to receive the side loads that are incurred during piston stroke and would normally be absorbed by a skirt. To achieve this, the first and second sliding surfaces 62, 66 are disposed substantially beneath the outer profile of the ring belt 32. Referring to FIG. 2, a guidance member radius $R_1$ is defined as the distance between the first axis A and the outermost point of one of the sliding surfaces 62, 66 in a direction perpendicular to the first axis A. A piston head radius $R_2$ is defined as the distance between the first axis A and the outermost point of the ring belt 32 in a direction perpendicular to the first axis A. The guidance member radius $R_1$ is substantially the same as the piston head radius $R_2$. According to the exemplary embodiment, the guidance member radius $R_1$ is within approximately ±5% of the piston head radius $R_2$, so, for example, if the piston head radius $R_2$ is 500 millimeters, then the guidance member radius $R_1$ would be between approximately 475 millimeters and 525 millimeters.

In order to accommodate the loading imposed on the first and second guidance members 60, 64, the first and second sliding surfaces 62, 66 could be accommodated with a friction reducing coating, or with a bearing surface, such as a rolling or sliding bearing. Additionally, just as the shape of the ring belt 32 could differ, the geometry of the first and second sliding surfaces 62, 66 would need to accommodate the specific shape of the cylinder 24, depending on the type of engine 20 used.

In addition, the piston head 28 is constructed without a skirt, and the size of the ring belt 32 depending from the periphery of the piston head 28 needs only to be necessary to support the desired number of piston rings 74. Referring to FIGS. 2 and 3, the ring belt 32 includes a lower distal edge 72 disposed, in the direction of the first axis A, below the lowermost piston ring 74. The lower distal edge 72 does not need to extend, in the direction of the first axis A, beyond the center of the pin bores 54. According to the exemplary embodiment, the lower distal edge 72 extends, in the direction of the first axis A, no further than the top of the pin bores 54. Alternatively, the lower distal edge 72 can extend to some point intermediate the top of the pin bores 54 and the center of the pin bores 54.

Figure 5:
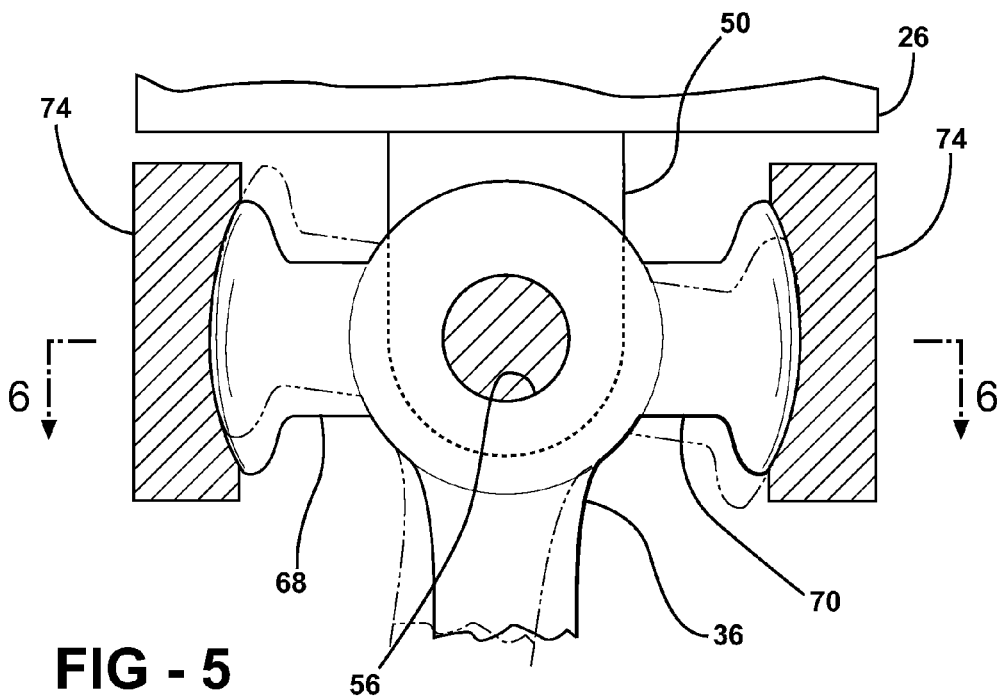
FIG. 5 is a cross section of a connecting rod in accordance with an alternative embodiment of the present invention.
Figure 6:
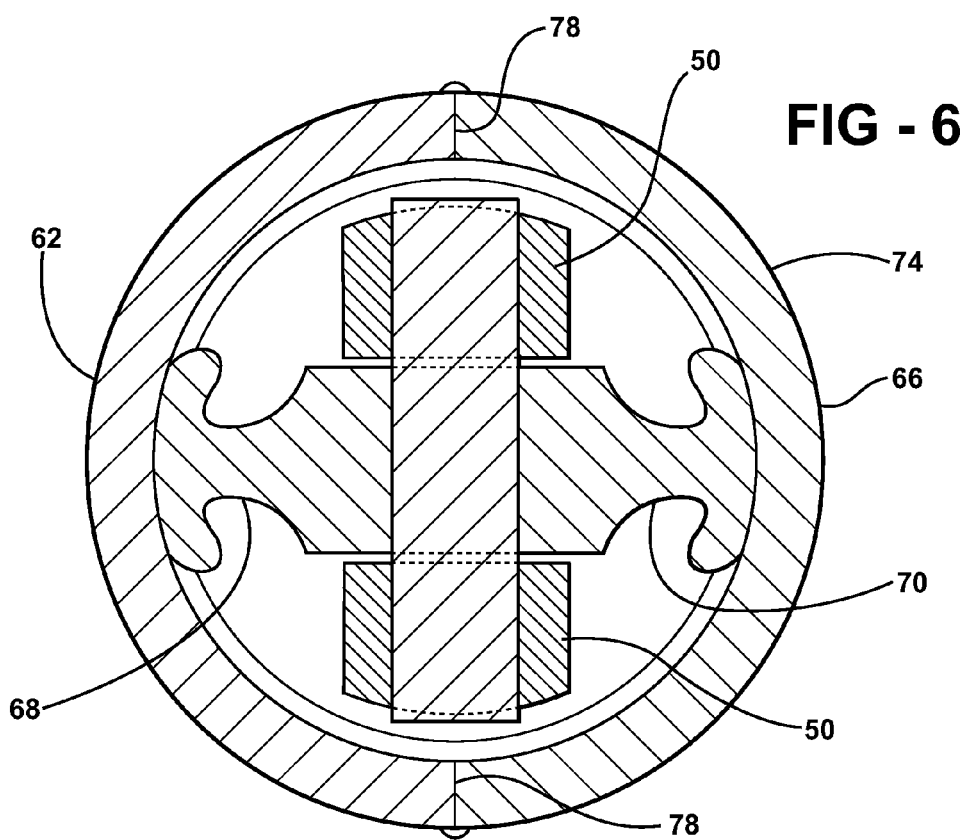
FIG. 6 is a cross section taken along line 6-6 of FIG. 5 in accordance the alternative embodiment.

Alternatively, as shown in FIGS. 5-6, the connecting rod 36 could include a ring 74 surrounding the first and second guidance members 60, 64. A coating surface can be provided on said first and second guidance members 60, 64 radially inward of said ring 74 allowing the connecting rod 36 to slide relative to the ring as it oscillates during the piston stroke. In this alternative embodiment, the first and second sliding surfaces 62, 66 are disposed on the outer surface of the ring 74 to engage the cylinder 24 along the piston stroke. The ring 74 could optionally include a split 78 for manufacturing and installation purposes.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A connecting rod for a piston assembly comprising;
    a shaft extending between a first end and a second end and having a longitudinal axis,
    an attachment boss disposed at said first end of said shaft defining an attachment bore therein extending along a shaft bore axis that is transverse to said longitudinal axis for receiving a piston pin, and
    a pair of guidance members disposed immovable on said attachment boss and projecting radially outwardly therefrom in opposite directions along an axis transverse to said longitudinal axis and said shaft bore axis, said guidance members having radially outer sliding surface that are discontinuous in a circumferential direction when viewed along said longitudinal axis.

2. A connecting rod as set forth in claim 1 wherein said sliding surface is arcuate in the longitudinal direction of said shaft.

3. A connecting rod as set forth in claim 1 including a ring formed separately from and surrounding said first and second guidance members.

4. A connecting rod as set forth in claim 3 including a coating surface disposed on said first and second guidance members.

5. A connecting rod as set forth in claim 1 wherein said first and second guidance members are fabricated as a single piece with said attachment boss.

6. A connecting rod as set forth in claim 1 including a crankshaft boss defining a crankshaft bore at said second end of said shaft for connecting said shaft to a crank.

7. A piston assembly comprising;
    a piston head for reciprocating within a cylinder along a first axis and including a pair of pin bosses depending downwardly from said piston head in the direction of the first axis and defining pin bores therein aligned axially with each other defining a second axis, a connecting rod including a shaft and an attachment boss disposed at a first end of said shaft, said attachment boss defining an attachment bore for axial alignment with said pin bores of said piston head; a wrist pin pivotally connecting said connecting rod to said piston head about the second axis, and said connecting rod including a pair of guidance members disposed immovably on said attachment boss and projecting radially outwardly therefrom in opposite directions along an axis transverse to said second axis, said guidance members having radially outer sliding surfaces that are discontinuous in a circumferential direction when viewed along a longitudinal axis of said connecting rod.

8. An assembly as set forth in claim 7 wherein said sliding surfaces are arcuate.

9. An assembly as set forth in claim 7 including a ring belt depending downwardly from a radial periphery of the piston head.

10. An assembly as set forth in claim 9 wherein said ring belt includes a lower distal edge extending in the direction of the first axis and extending no further than a center of said pin bores.

11. An assembly as set forth in claim 9 wherein said ring belt includes a lower distal edge extending in the direction of the first axis and terminating between a top of said pin bores and a center of said pin bores.

12. An assembly as set forth in claim 9 wherein said ring belt includes a lower distal edge extending in the direction of the first axis and extending no further than a top of said pin bores.

13. An assembly as set forth in claim 9 including a guidance member radius being defined as the distance between the first axis and an outermost point of said sliding surface and a piston head radius being defined as the distance between the first axis and an outermost point of said ring belt and wherein said guidance member radius is substantially the same as said piston head radius.

14. An assembly as set forth in claim 13 wherein the distance associated with said guidance member radius is within approximately ±5% of the distance associated with said piston head radius.

15. An assembly as set forth in claim 7 wherein said second guidance member is spaced radially by approximately 180 degrees from said first guidance member about the second axis.

16. An assembly as set forth in claim 7 wherein said first and second sliding surfaces are spaced perpendicularly from the second axis for contacting the side walls of the cylinder as the piston head translates along the first axis.

17. An assembly as set forth in claim 7 wherein said first and second guidance members are formed as a single piece with said attachment boss.

18. An assembly as set forth in claim 7 including a ring surrounding said first and second guidance members and including a coating surface disposed on said first and second guidance members.

19. A piston assembly comprising;
a piston head for reciprocating within a cylinder along a first axis and having a top extending circumferentially about the first axis, said piston head including a ring belt extending downwardly from said top in the direction of the first axis, said piston head including a pair of pin bosses depending downwardly from said top in the direction of the first axis and disposed radially inward from said ring belt and said pin bosses defining pin bores therein aligned axially with each other defining a second axis perpendicular to the first axis, a connecting rod including a shaft and an attachment boss disposed at a first end of said shaft and said attachment boss defining an attachment bore axially aligned with said pin bores and disposed between said pin bosses, a piston pin inserted along said second axis radially within said pin bores and said attachment bore of said shaft pivotably connecting said connecting rod about the second axis to said piston head, and said connecting rod including a pair of guidance members disposed immovably on said attachment boss and projecting radially outwardly therefrom in opposite directions along an axis transverse to said second axis, said guidance members having radially outer sliding surfaces that are discontinuous in a circumferential direction when viewed along a longitudinal axis of said connecting rod.

20. An assembly as set forth in claim 19 including a ring surrounding said first and second guidance members and including a coating surface disposed on said first and second guidance members.

21. An assembly as set forth in claim 19 including a first support rib extending from said shaft perpendicularly to the second axis connecting said shaft to one of said pair of guidance members and a second support rib extending from said shaft perpendicularly to the second axis connecting said shaft to the other of said pair of guidance members wherein said first and second support ribs are fabricated as a single piece with said attachment boss.

* * * * *